United States Patent
Watanabe (10) Patent No.: US 8,397,031 B2
(45) Date of Patent: Mar. 12, 2013

(54) APPARATUS, PROCESSOR AND METHOD OF CACHE COHERENCY CONTROL

(75) Inventor: Yoshiaki Watanabe, Yamanashi (JP)

(73) Assignee: NEC Computertechno, Ltd., Kofu-Shi, Yamanashi (JP)

( * ) Notice: Subject to any disclaimer, the term of this patent is extended or adjusted under 35 U.S.C. 154(b) by 569 days.

(21) Appl. No.: 12/314,492

(22) Filed: Dec. 11, 2008

(65) Prior Publication Data

US 2009/0193232 A1    Jul. 30, 2009

(30) Foreign Application Priority Data

Jan. 28, 2008    (JP) ................... 2008-015828

(51) Int. Cl.
*G06F 12/08* (2006.01)

(52) U.S. Cl. . 711/141; 711/154; 711/210; 711/E12.026; 712/205; 712/E9.032; 712/E9.033

(58) Field of Classification Search ........................ None
See application file for complete search history.

(56) References Cited

U.S. PATENT DOCUMENTS

| | | | |
|---|---|---|---|
| 5,274,787 A | 12/1993 | Hirano et al. | |
| 5,487,022 A * | 1/1996 | Simpson et al. | 708/205 |
| 5,742,831 A * | 4/1998 | Creta | 711/118 |
| 6,490,657 B1 * | 12/2002 | Masubuchi et al. | 711/135 |
| 6,557,084 B2 * | 4/2003 | Freerksen et al. | 711/147 |
| 6,584,580 B1 * | 6/2003 | Yamato et al. | 714/10 |
| 2002/0035675 A1 * | 3/2002 | Freerksen et al. | 711/151 |
| 2003/0009631 A1 * | 1/2003 | Arimilli et al. | 711/135 |
| 2003/0058381 A1 | 3/2003 | Shinohara et al. | |
| 2007/0050603 A1 * | 3/2007 | Vorbach et al. | 712/221 |
| 2007/0174557 A1 * | 7/2007 | Watanabe | 711/146 |
| 2007/0180196 A1 * | 8/2007 | Guthrie et al. | 711/141 |
| 2008/0320224 A1 | 12/2008 | Kiyota | |
| 2009/0113134 A1 * | 4/2009 | Irish et al. | 711/134 |

FOREIGN PATENT DOCUMENTS

| | | |
|---|---|---|
| JP | 3-214337 (A) | 9/1991 |
| JP | 2003-150444 (A) | 5/2003 |
| JP | 2003-150573 | 5/2003 |
| JP | 2003-150573 (A) | 5/2003 |
| WO | WO 2007/105256 (A1) | 9/2007 |

OTHER PUBLICATIONS

Partial English translation of Japanese Office Action dated Dec. 8, 2009.

* cited by examiner

*Primary Examiner* — Jasmine Song
*Assistant Examiner* — Daniel Bernard
(74) *Attorney, Agent, or Firm* — McGinn IP Law Group, PLLC (57) ABSTRACT

An apparatus includes a plurality of processors each of which includes a cache memory, and a controller which suspends a request of at least one of the processors during a predetermined period when a processor fetches a data from a main memory to the cache memory, wherein the controller suspends the request of at least one of the processors except the processor which fetches the data from the main memory to the cache memory.

28 Claims, 10 Drawing Sheets

APPARATUS, PROCESSOR AND METHOD OF CACHE COHERENCY CONTROL

INCORPORATION BY REFERENCE

This application is based upon and claims the benefit of priority from Japanese patent application No. 2008-015828, filed on Jan. 28, 2008, the disclosure of which is incorporated herein in its entirety by reference.

BACKGROUND OF THE INVENTION

1. Field of the Invention

The present invention relates to a cache coherency control for a multi-processor system in which multiple processors share a main memory.

2. Description of Related Art

A "snoop method" is known as a technique for ensuring a coherency among caches in a multi-processor system in which multiple processors share a main memory. In the snoop method, the caches of the processors "handshake" with each other, so that each processor grasps (obtains) a renewal of a data stored in the cache of each of the processors, thereby knowing in which cache the latest data exists and purging a line (i.e., in its cache) as necessary to be able to obtain the latest data, thereby to maintain a cache coherency.

As an access to a main memory, an ordinary processor supports both of an access via a cache and a direct access to the main memory. In a case of the access via the cache, a processing differs depending on whether the cache of the processor operates in a "write-through method" or in a "write-back method".

The write-through method is a method in which a renewed data is not only stored to the cache, but also written back to the main memory at the same time when a CPU (Central Processing Unit) performs a write to the main memory.

The write-back method is a method in which, when the CPU performs a write to the main memory, the renewed data stays in the cache and is not written back to the main memory unless a condition is satisfied. The condition for writing back may be, for example, a case where a number of read/write operations for a frame address becomes equal to or more than a number of ways of the main memory, a case where another processor requests an access to a cache line to be written back, and the like.

In a multi-processor system including the processors each of which have caches operating in the write-back method, the snoop method uses an invalidation-type protocol.

In the invalidation-type protocol, in a case where a cache performs a renewal with respect to an address being looked up by a plurality of caches, cache lines of all caches, each of the cache lines corresponding to the address being looked up, are invalidated. The cache lines which are invalidated become a so-called "dirty" state. Thus, there is no existence of a state that old data is cached in other caches even though a line corresponding to the old data is renewed, and cache coherency is accomplished. As the invalidation-type protocol, there are an MESI protocol, an MOSI protocol, and the like.

For example, in a case of the MESI protocol, the cache in each processor is administered by being defined into the following four states.

State 1: A state that a target data which is the target of a command issued by the processor does not exist in the cache. This state is also hereinafter referred to as an "I (Invalid) state".

State 2: The targeted data exists in the cache and is the same as a data which is stored in the main memory. Furthermore, the targeted data also exists in caches of other processors. This state is also hereinafter referred to as an "S (Shared-Unmodified) state".

State 3: The targeted data exists only in the cache of one of the processors and is the same as the data which is stored in the main memory. This state is also hereinafter referred to as an "E (Exclusive) state".

State 4: The targeted data exists only in the cache of one of the processors, and is different from the data which is stored in the main memory. In this state, the data which exists in the cache is the latest data that has not yet been written back to the main memory. This state is also hereinafter referred to as an "M (Modified) state".

In the multi-processor system, a problem may arise in the cache coherency in a case where a plurality of the processors read data of the same cache line address (hereinafter the "cache line address" is simply referred to as an "address") at a close time. A multi-processor system 1 as shown in FIG. 9 will be described as an example.

Figure 9:
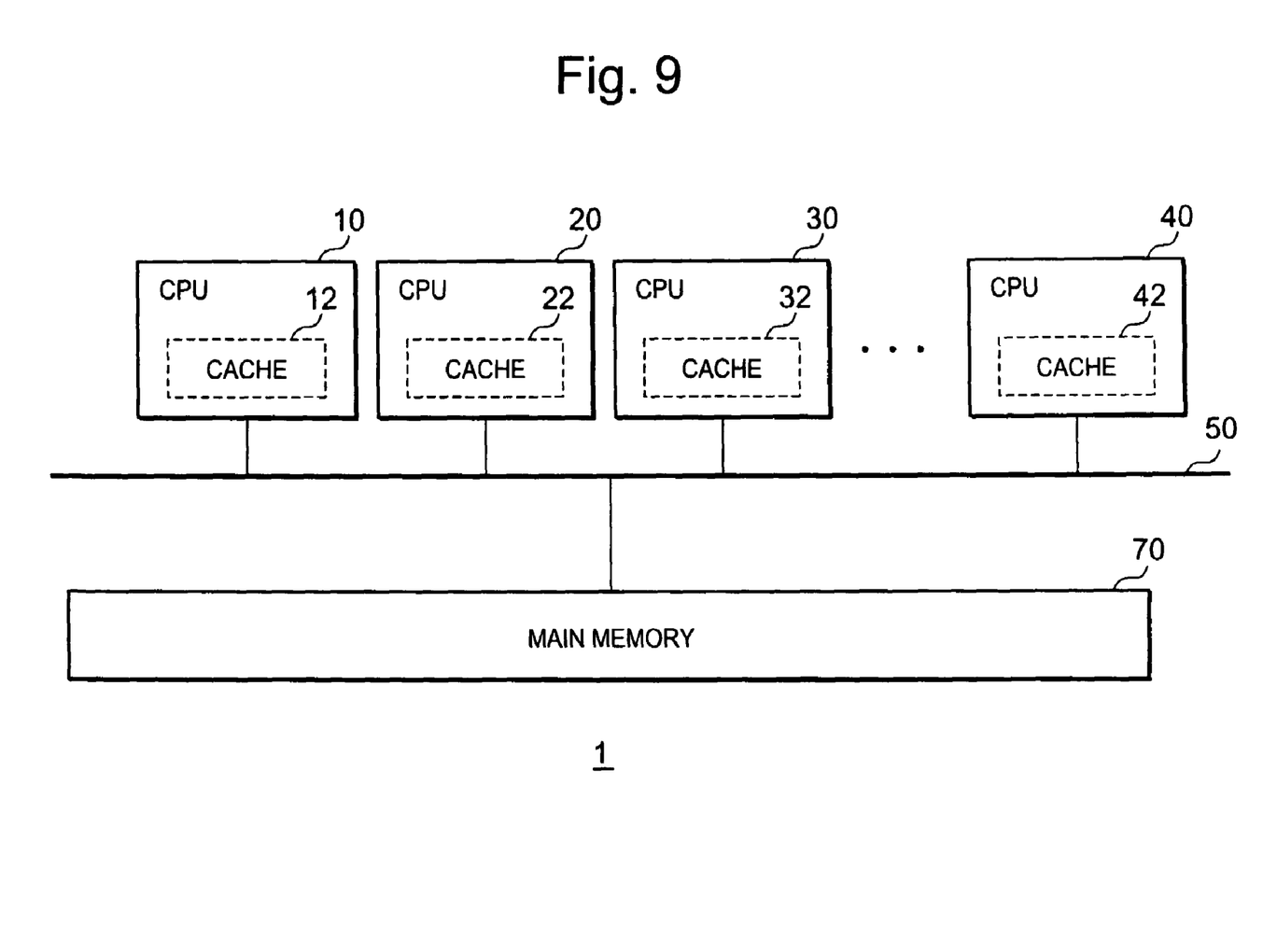
FIG. 9 shows a multi-processor system of a related art.

The multi-processor system 1 shown in FIG. 9 includes a plurality of (e.g., four CPUs are shown) CPUs 10 to 40, a shared bus 50, and a main memory 70.

CPUs 10 to 40 are connected to the shared bus 50, and may communicate with each other and may access the main memory 70 via the shared bus 50. The CPUs 10 to 40 respectively include a cache 12, a cache 22, a cache 32, and a cache 42, and these caches operate in the write-back method.

For example, when the CPU 10 reads data of an address (assumed to be an address A) in the main memory 70, if the data does not exist in the cache 12 of the CPU 10, a "cache miss" occurs. In this case, the CPU 10 outputs not only a read request to the main memory 70, but also a snoop request corresponding to the address A. The snoop request is received by all other CPUs connected to the shared bus 50.

Each CPU, which receives the snoop request, looks up the cache state of its own cache, and in a case where the data of the address A exists in its own cache, namely, in a case of a "cache hit", the CPU having the cache hit, transfers the data to the CPU 10. In a case where the cache state of the CPU having the cache hit is the state 4 (e.g., M state), the CPU also writes back the data to the main memory 70.

It depends on the design of the system whether the cache in the state 3 (E state) or in the state 4 (M state) transits to (e.g., becomes) either of the state 1 (I state) or in the state 2 (S state).

Normally, the CPU reads the data from the cache or the main memory to renew the data. If the cache in the E state and the M state transits to the S state after outputting the data to another processor, then it is necessary to output a request for invalidating the cache lines, which corresponds to the outputted data, of other CPUs when each of the other CPUs which receives the data performs renewal of the data and stores the renewed data to the cache of its own.

Thus, a lot of traffic for the request for invalidating occurs on the shared bus 50, and the efficiency of the multi-processor system 1 deteriorates. Therefore, if the cache in the E state or the M state transits to the I state after outputting the data, then the efficiency of the multi-processor system is improved.

If the CPUs other than the CPU 10 get the cache miss when the CPU 10 gets the cache miss, request the missed data corresponding to an address "B", for example, to the main memory 70, and send the snoop request to other CPUs, then CPU 10 reads the missed data from the main memory 70 according to the request which is issued to the main memory 70 by the CPU 10. A case where the CPU 20 gets the cache miss of the data corresponding to the address "B" during the CPU 10 reading the missed data, will be described below.

In this case, the CPU 20 sends the read request of the address B to the main memory 70 and sends the snoop request to the other CPUs. When the CPU 10 receives the snoop request from the CPU 20, the CPU 10 incurs the cache miss because the data is not yet stored in the cache of the CPU 10, and outputs a message to the CPU 20. The message indicates that the CPU 10 does not have the data corresponding to the address "B". And, it is assumed that the CPU 30 and the CPU 40 also incur the cache misses and output the message to the CPU 20, with the message indicating that the CPU 30 and 40 do not have the data corresponding to the address "B".

The CPU 10 continues the read operation for the data corresponding to the address "B", and receives the data corresponding to the address "B" from the main memory 70. All of the CPU 20, CPU 30, and CPU 40 incur the cache misses with respect to the address "B" Thus, the CPU 10 stores the data corresponding to the address "B" in the cache in the E state (i.e., the CPUs other than the CPU 10 do not have the data corresponding to the address "B").

On the other hand, the CPU 20 also receives the data of the address "B" from the main memory 70 because the CPU 20 requests the data corresponding to the address "B" to the main memory 70. The CPU 20 also stores the data corresponding to the address "B" in the E state because all of the CPU 10, CPU 30, and the CPU 40 incur the cache misses and output a message to the CPU 20. The message indicates that the CPUs 10, 30 and 40 do not have the data corresponding to the address "B". In other words, from the viewpoint of CPU 20, CPU 20 recognizes that the data corresponding to the address "B" is only stored in the CPU 20 (just like CPU 10) even though both of the caches of the CPUs 10 and 20 have the data corresponding to the address "B".

As a result, in the multi-processor system 1, the caches of the two processors (i.e., the CPU 10 and 20) have the data corresponding to the same address "B" in the E (Exclusive) state. This results in a breakdown of the cache coherency with respect to the address "B".

This problem (condition) is caused by the fact that the CPU 10 replies "cache miss" in response to the snoop request from another CPU while reading the data from the main memory. Patent Document 1 discloses a method to solve this problem (section [0062] to [0066] in Patent Document 1).

In the method disclosed in the Patent Document 1, when each of the processors receives a snoop request from other processors, while each of the processors reads data corresponding to a certain address from the main memory, each of the processors sends an "RTY" signal, which indicates that the snoop request and the read request to the main memory are terminated and are to be retried again, to other processors which have sent the snoop request. Other processors which receive the "RTY" signal the retry the snoop request and the read request.

With the method described above, the processor is prevented from replying "cache miss" while the processor is reading the data from the main memory. Thus, the cache coherency is maintained.

[Patent Document 1] Japanese Patent Laid-Open No. 2003-150573

However, if the method disclosed in the Patent Document 1 is applied to the multi-processor system 1 shown in FIG. 9, then problems will arise in a case where a plurality of the processors read the same address at a close time (e.g., very close in time or almost simultaneously at a same time).

Figure 10:
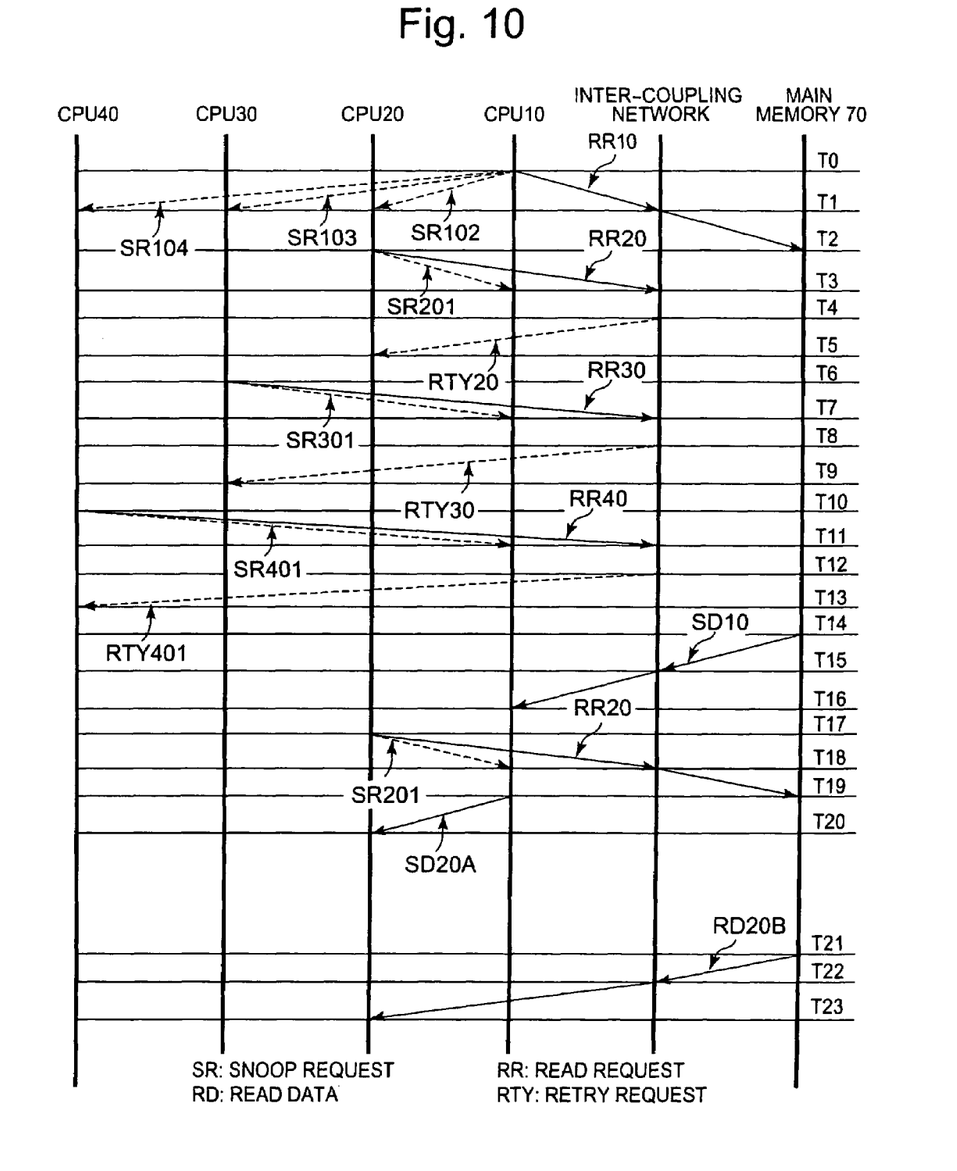
FIG. 10 is an example of a timing chart of the related art.

FIG. 10 shows an example of a timing chart of the case where the method disclosed in the Patent Document 1 is applied to the multi-processor system 1 shown in FIG. 9. In FIG. 10, SR, RR, RD, RTY denote "snoop request", "read request", "read data", and "retry request", respectively. T1, T2, . . . denote timings.

In FIG. 10, the snoop requests relating to the CPU 10 are described, and other snoop requests are omitted in FIG. 10. The "RTY", which is outputted by the CPU 10 to the inter-coupling network when the CPU 10 receives the snoop request from other CPUs while reading data from the main memory 70, is omitted.

In the example shown in FIG. 10, at T0, the CPU 10 incurs the cache miss with respect to data corresponding to an address "C". Accordingly, the CPU 10 outputs a read request RR10 to the main memory 70, and outputs a snoop request (SR102, SR103, SR104) to CPUs 20, 30, and 40. It is assumed that the CPU 20 to 40 also incur cache misses with respect to the data corresponding to the address "C", and do not respond to the snoop request.

At T1, the read request RR10 from the CPU 10 is issued to the main memory 70 via the inter-coupling network.

At T2, the CPU 20 incurs a cache miss with respect to the data corresponding to the address "C", and outputs a read request RR20 to the main memory 70 and outputs the snoop request. Thus, at T3, the CPU 10 receives the snoop request SR201, and the inter-coupling network receives the read request RR20.

Because the CPU 10 is reading the data corresponding to the address "C" from the main memory 70, the inter-coupling network outputs a retry request RTY20 to the CPU 20 at T4.

Thereafter, the CPU 30 and CPU 40, which incur cache misses with respect to the data corresponding to the address "C", receive retry requests RTY30 and RTY40 from the inter-coupling network.

At T14, the main memory 70 outputs the data corresponding to the address "C" (read data RD10) to the CPU 10 via the inter-coupling network. The data is sent by the inter-coupling network to the CPU 10 at T15.

At T16, the CPU 10 receives the read data RD10, and stores the read data RD10 in the cache 12. Thus, the cache 12 of the CPU 10 transits (e.g., transitions, changes, etc.) from the state I to the state E.

In response to the retry request RTY20, the CPU 20 outputs the read request RR20 with respect to the data corresponding to the address "C" and the snoop request again at T17. At this time, the CPU 10 gets a cache hit in response to the snoop request sent from the CPU 20, and thus outputs the data RD10 to the CPU 20 as read data RD20A (T19). At this moment, the cache 12 of the CPU 10 transits (e.g., transitions, changes, etc.) to the state I (invalid) from the state E. In other words, the cache 12 of the CPU 10 transits to an Invalid state soon after the cache 12 transits to an Exclusive state.

When the CPU 20 receives the read data RD20A from the CPU 10 at T20, the CPU 20 stores the read data RD20A in the cache 22.

The main memory 70 also outputs read data RD20B to the CPU 20 at T21 in response to the read request RR20 but the CPU 20 discards the read data 20B because the latest data, which is sent from the CPU 10, is already stored in the cache of the CPU 20.

The read data RD10 is stored in the cache 12 of the CPU 10 only in a period T16 to T18. After the period T16 to T18, the read data RD10 becomes invalid because the cache 12 transits to the I state from the E state.

A reason why the CPU 10 reads the data is usually to renew the read data. If the CPU 10 outputs the read data to another processor before renewing and storing the data in the cache, then the state of the cache returns back to the I (invalid) state, thereby incurring a cache miss again even though the CPU 10 read the data from the main memory. Accordingly, a handshake with another CPU is needed to complete the renewal of the read data, thus resulting in a longer latency. As a result, the processing efficiency in the system deteriorates.

SUMMARY OF THE INVENTION

According to one exemplary aspect of the present invention, an apparatus includes a plurality of processors each of which includes a cache memory, and a controller which suspends a request of at least one of the processors during a predetermined period when a processor fetches a data from a main memory to the cache memory, wherein the controller suspends the request of at least one of the processors except the processor which fetches the data from the main memory to the cache memory.

According to another exemplary aspect of the present invention, a processor includes a cache memory, a request issuing circuit which issues a request when a cache miss occurs, and a controller which suspends issuing of the request during a predetermined period upon receiving a suspension signal from another processor that fetches the data to the cache memory according to the cache miss.

According to another exemplary aspect of the present invention, a method of controlling a plurality of processors each of which includes a cache memory, includes fetching a data from a main memory to the cache memory of a processor according to a cache miss, and suspending a request of the processors, except the processor that fetches the data from the main memory to the cache memory, during a predetermined period.

BRIEF DESCRIPTION OF THE DRAWINGS

Other exemplary aspects and advantages of the invention will be made more apparent by the following detailed description and the accompanying drawings, wherein.

DETAILED DESCRIPTION OF THE EXEMPLARY EMBODIMENTS

Figure 1:
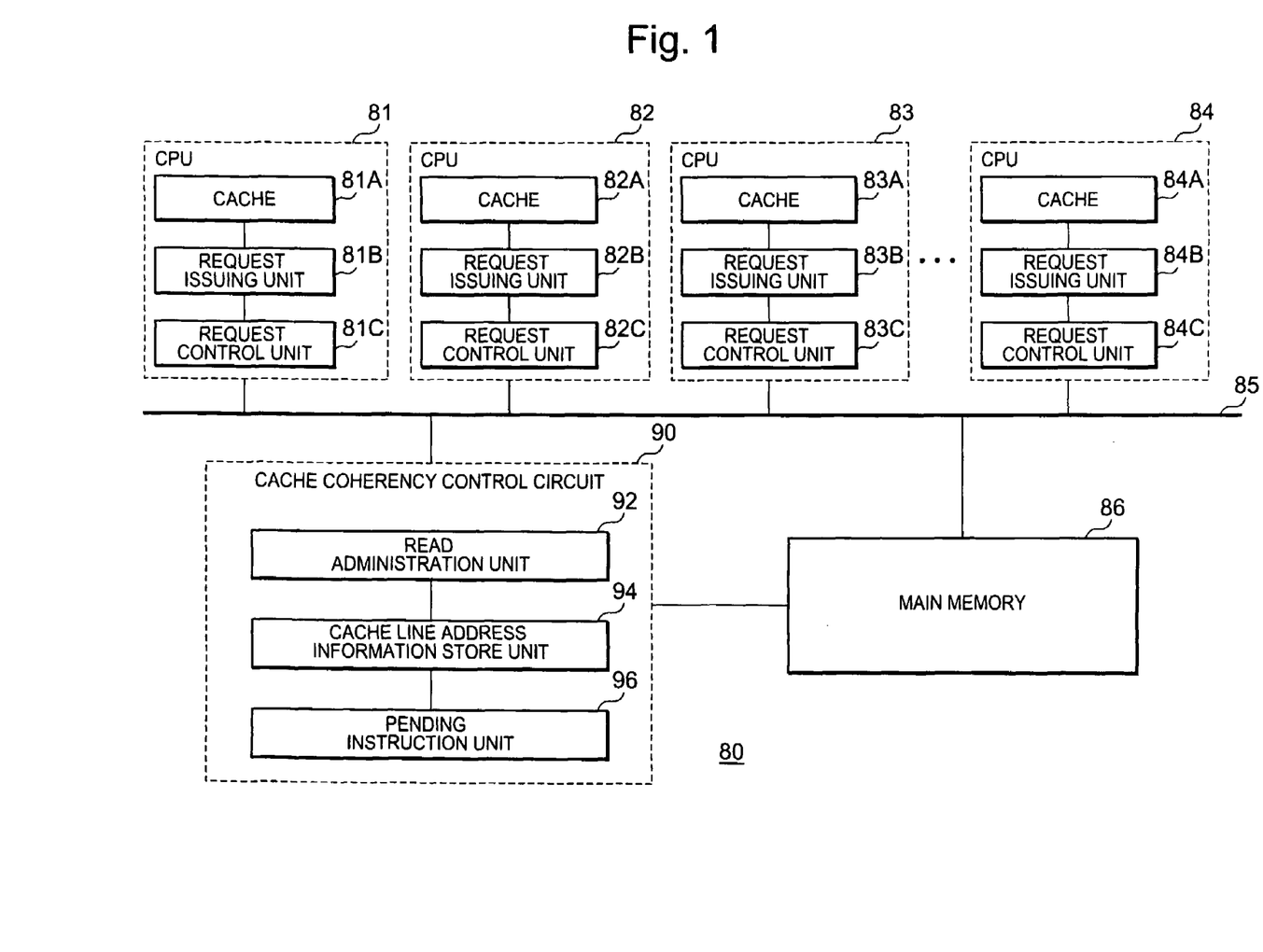
FIG. 1 is an example of a diagram of a multi-processor system of the present invention.

FIG. 1 shows a multi-processor system 80 to which the cache coherency control technology of the present invention is applied. The multi-processor system 80 includes a plurality of (four in the example shown in FIG. 1) processors (CPUs) 81 to 84, a shared bus 85, a cache coherency control circuit 90, and a main memory 86. As an example, the multi-processor system 80 uses the snoop method as a method of ensuring cache coherency, and specifically, the protocol is MESI. Of course, other configurations and other protocols are possible. FIG. 1 shows only elements relating to read operations, and other elements usually equipped with the multi-processor system are omitted from the FIG. 1 and the description thereabout is omitted.

CPUs 81 to 84 are connected to the shared bus 85, and may communicate with each other and may access the main memory 86 via the shared bus 85. The CPU 81 includes a write-back type cache 81A, a request issuing unit 81B, and a request control unit 81C. CPUs 82 to 84 also include the same configuration as the CPU 81.

The details of each of the elements equipped in each of the CPUs will be described taking the CPU 81 as an example.

When a necessity arises to read data which is stored in the main memory 86 due to a request of a CPU core (not shown in FIG. 1) of the CPU 81, the cache 81A confirms whether the latest data which is required by the CPU core is stored in the cache 81A itself. In a case where the latest data is stored in the cache 81A, the cache 81A assumes a cache hit and supplies the data to the CPU core. On the other hand, in a case where the latest data is not stored, the cache 81A assumes a cache miss and notifies the request issuing unit 81B of the cache miss.

Upon receiving the notification of the cache miss, the request issuing unit 81B outputs a request relating to a read operation (e.g., a read request which requests a data from the main memory, a snoop request, etc.) via the shared bus 85. Specifically, the request issuing unit 81B outputs the read request to the multi-processor system 80, and outputs the snoop request. When the request issuing unit 81B is controlled by the request control unit 81C to suspend issuing the request relating to the read, the request issuing unit 81B suspends issuing the request, and issues the request after a predetermined period passes.

When any one of the CPUs 82 to 84 get the cache hit in response to the snoop request which is issued by the request issuing unit 81B of the CPU 81, the CPU having the cache hit transfers the data to the CPU 81. The CPU 81 stores the received data in the cache 81A. In this case, if the latest data in the CPU having the cache hit is not yet written back to the main memory 86, the CPU performs a write-back operation. The cache of the CPU, which outputs the data to the CPU 81, transits to the I state.

When the request control unit 81C receives a pending instruction from the cache coherency control circuit 90, the request control unit 81C controls the request issuing unit 81B to temporarily suspend issuing the request relating to a read.

The cache coherency control circuit 90 includes a read administration unit 92, a cache line address information store unit 94, and a pending instruction unit 96.

When the read administration unit 92 receives the read request from any one of the CPUs 81 to 84, the read administration unit 92 allows a read on condition that a cache line address corresponding to the read request is not stored in the cache line address information store unit 94. Allowance/rejection of a read is executed by, for example, either transferring/not transferring the read request to the main memory 86.

The main memory 86 transmits the data, of which the read administration unit 92 allows the read operation, to the CPU which issues the read request via the shared bus 85, and informs the cache coherency control circuit 90 that the main memory 86 transmits the data to the CPU. The main memory 86 may output the data directly to the shared bus 85 in FIG. 1, but may output the data via the cache coherency control circuit 90.

When a requester CPU, which requests the read request, receives the data from the main memory 86, the requester CPU stores the data in the cache of the requester CPU.

When any one of the CPUs executes the read operation of the data from the main memory 86, the cache line address information store unit 94 holds the cache line address of the data until the data is outputted to the requester CPU. The read administration unit 92 looks up cache line address information which is stored in the cache line address information store unit 94, and determines whether to allow or reject the read request which is requested by another CPU.

In synchronization with the data corresponding to the cache line address which is stored in the cache line address information store unit 94 being outputted to the requester CPU, the pending instruction unit 96 outputs to each of the CPUs other than the requester CPU a pending instruction for temporarily suspending issuing the request relating to the read of the data corresponding to the cache line address which is stored in the cache line address information store unit 94.

When a plurality of the CPUs issue a request relating to the read of the same cache line address at a close time (e.g., at about the same time within a predetermined threshold), a CPU which requests at first is assumed to be a "precedent CPU", and other CPUs which request subsequent to the precedent CPU are assumed to be "subsequent CPUs". If the subsequent CPUs issue the read request while the precedent CPU reads the data from the main memory, then the cache coherency control circuit 90 rejects the read request of the subsequent CPUs. By rejecting the read request of the subsequent CPUs, the multi-processor system 80 may prevent that the cache state of more than two CPUs become an "E state" with respect to the same cache line address even if a plurality of CPUs access to the same cache line address at a close time (e.g., within a predetermined close time). Therefore, the cache coherency of the multi-processor system 80 may be maintained.

When data is sent to a CPU (for example, the CPU 81) which executes the read operation, the cache coherency control circuit 90 sends the pending instruction to each CPU other than the CPU 81 to temporarily suspend issuing the request relating to the read of the data. Thereby, the CPUs 82 to 84 which receive the pending instruction suspend the read request and the snoop request for the predetermined period. Thus, the data may be prevented from being invalidated by the snoop request of the CPUs 82 to 84 right after the data is stored in the cache 81A of the CPU 81.

Therefore, for the predetermined period, the CPU 81 may get the cache hit. Accordingly, the CPU 81 may complete an operation to renew the data which is stored in the cache 81A before the data becomes (e.g., enters) an invalid state. If the data which is stored in the cache 81A become invalid before the CPU 81 renews the data, then the CPU 81 may retry to read the data. This retry may cause an access latency. In the present invention, the multi-processor system 80 may prevent the access latency.

The CPU, which issues the request relating to the read corresponding to the cache line address stored in the cache line address information store unit 94, retries the request after the request is rejected. The CPU in which the request is rejected may memorize (e.g., store) a history of the read requests, and may retry every time after being rejected.

When the CPU, which is reading the data from the main memory 86, receives a snoop request, which corresponds to the cache line address of the data being read from the main memory, from other CPUs, the CPU which receives the snoop request may send a retry instruction to other CPUs instead of sending a notification of the cache miss.

By sending the retry instruction from the cache coherency control circuit 90 to the CPU that the read request is rejected, a work load of the CPUs may be reduced. That is, each of the CPUs do not need to memorize (store) the history of the read requests and to retry the read request by its own.

The snoop request which corresponds to the cache line address "a", for example, is not necessarily issued from other CPUs to the CPU 81 which stores the data of the cache line address "a" in the cache 81A by the read operation right after the CPU 81 stores the data in the cache 81A. Thus, when there is no snoop request from other CPUs with respect to the cache line address "a", the efficiency of the multi-processor system 80 may be decreased if other CPUs are suspended issuing the request relating to the read operation for the predetermined period.

On the other hand, when other CPUs retry the read request since the read request with respect to the address "a" is rejected, there is a high possibility that other CPUs issue the snoop request, which corresponds to the address "a", to the CPU 81 right after the CPU 81 stores the data corresponding to the address "a" in the cache 81A.

Therefore, by suspending the request relating to the read operation only when there are at least one of the CPUs which retries the read request, the efficiency of the multi-processor system 80 may be improved. Also, by suspending the request relating to the read operation only when there are at least one of the CPUs which issues the read request while the CPU 81 fetches the data of the address "a" from the main memory 86, the efficiency of the multi-processor system 80 may also be improved.

When the other CPUs, which is other than the CPU 81, does not retry the read request with respect to the address "a" while the CPU 81 reads the data of the address "a", there is not a high possibility that other CPUs will issue a snoop request, which corresponds to the address "a", to the CPU 81 right after the CPU 81 stores the data corresponding to the address "a" in the cache 81A.

Therefore, by suspending the request relating to the read operation of only the CPUs which retry the read request, the efficiency of the multi-processor system 80 may be improved. Also, by suspending the request relating to the read operation of only the CPUs which issue the read request while the CPU 81 fetches the data of the address "a" from the main memory 86, the efficiency of the multi-processor system 80 may also be improved.

The larger the number of the CPUs other than the CPU 81, which retry the read request while the CPU 81 reads the data of the address "a" from the main memory 86, the higher the possibility that the other CPUs will issue a snoop request, which corresponds to the address "a", to the CPU 81 right after the CPU 81 stores the data corresponding to the address "a" in the cache 81A. Therefore, the cache coherency control circuit 90 counts the number of the other CPUs which retry the read request while the CPU 81 reads the data of the address "a" by a counter circuit, and the cache coherency control circuit 90 suspends the request relating to the read operation of the other CPUs when the number of retries exceeds a predetermined value. By counting the number of retries and suspending the read request based on the number, the efficiency of the multi-processor system 80 may be improved.

The pending instruction unit 96 may output the pending instruction that includes the cache line address stored in the cache line address information store unit 94. Therefore, only the requests relating to the read operation corresponding to the cache line address, which is stored in the cache line address information store unit 94, are suspended. Thus, the efficiency of the multi-processor system 80 may be improved.

The cache coherency control technology of the present invention as described above, is especially advantageous for the multi-processor system in which successive accesses by the same processor to the same cache line address frequently occur. An example of such a multi-processor system will be described below.

Figure 2:
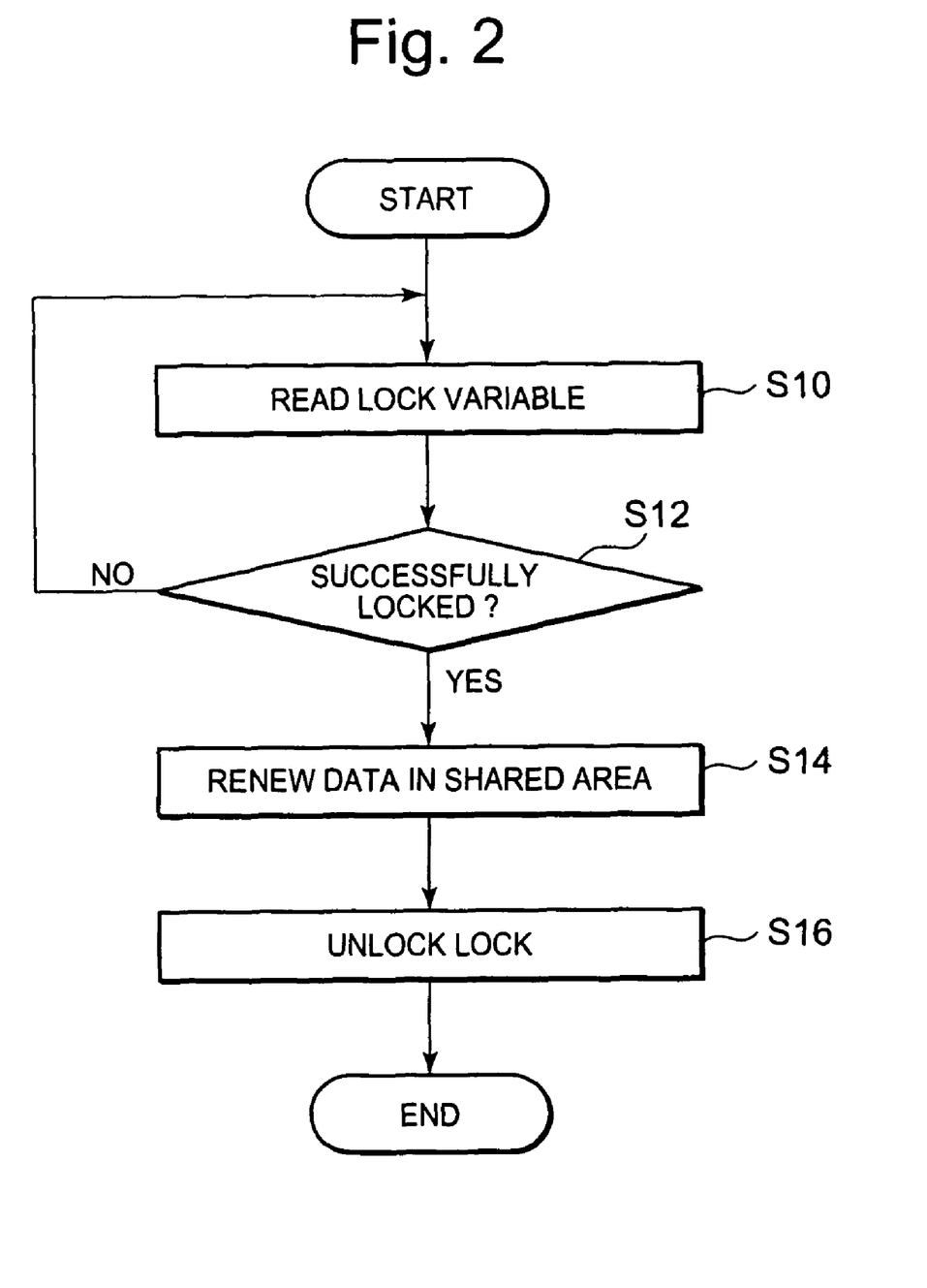
FIG. 2 is an example of a flow chart for explaining the present invention.

In the multi-processor system, a synchronization processing between the processors called a "lock sequence" is executed in relation to renewal of data in a shared area in a main memory. FIG. 2 shows this lock sequence.

As shown in the FIG. 2, when the processor renews the shared area, the processor first reads a lock variable arranged with respect to the shared area for showing whether the shared area is locked or not (S10). In a case where the lock variable indicates that the shared area is locked, the processor attempts to retry until the lock of the shared area is unlocked (S12, No). In a case where the lock variable indicates that the shared area is not locked (S12, Yes), the processor renews the lock variable to lock the shared area, and renews the data and stores the data after renewing the data (S14). Thereafter, the processor renews the lock variable to unlock the lock of the shared area (S16).

Figure 3:
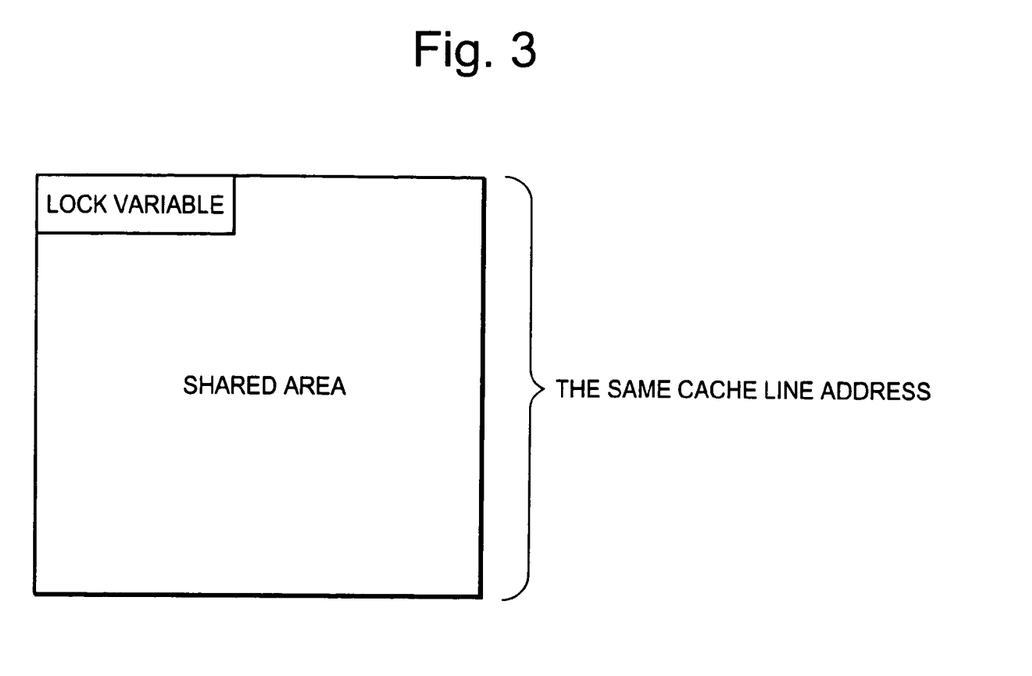
FIG. 3 is an example of a diagram for explaining the present invention.

In a case where the lock variable and the shared area are located in the same cache line address as shown in FIG. 3, an access to the shared area may be performed on the cache of the processor. Thus, the access may be performed with a short latency.

In the multi-processor system in which the lock variable and the shared area are located in the same cache line address as shown in FIG. 3, the processor first reads the lock variable to renew the shared area. After reading the lock variable, the lock variable is renewed. After renewing the lock variable, the same cache line address is read again to renew the shared area. After renewing the shared area, the same cache line address is accessed to store the renewed data. In other words, the same cache line address is successively accessed when the processor renews the shared area. The cache line, which includes the same lock variable in the caches of the processor being renewed of the shared area, is invalidated in synchronization with renewal of the lock variable according to the invalidation type protocol.

In other words, when data in the same cache line including the shared area and the lock variable which is stored in the cache of a processor (e.g., processor A) is transferred in response to the snoop request of another processor, the cache line of the processor A is invalidated. Accordingly, in a case where the another processor tries to read the same cache line address at a close time subsequent to the read operation of the processor A and incurs the cache miss, it is highly possible that the snoop request may occur before the processor A stores the renewed data. If so, the processor A incurs the cache miss when storing the data, thus resulting in deterioration of the processing efficiency in the system.

Accordingly, if the cache coherency control technology of the present invention is applied to such a multi-processor system, the deterioration of the processing efficiency in the lock sequence may be prevented even in a case where multiple processors perform the read requests of the same cache address line at a close time, thus making use of the advantage in arranging the lock variable and the shared area in the same cache line address.

For example, it is assumed that the latency at the time of the cache hit is 1 ns, the latency at the time of the cache miss is T ns, the number of processors is n sets, and the number of accesses to the shared area per one lock sequence is M times.

In this case, the processing time of the lock sequence is $M \times T \times (n-1)$ ns in a case where the cache coherency control technology of the present invention is not applied.

On the other hand, if the technology of the present invention is applied, the processing time of the lock sequence becomes $M \times 1$ ns, which is greatly reduced. The larger the variable n is, namely, the more processors that exist, the better (and more advantageously) the present invention can reduce the processing time. Recently, the number of CPUs in a multi-processor system have increased annually. The cache coherency control technology of the present invention is an effective technology for the multi-processor system having an ever-increasing number of CPUs to improve the processing efficiency.

An exemplary embodiment of the present invention will be described below in consideration of the above description.

Figure 4:
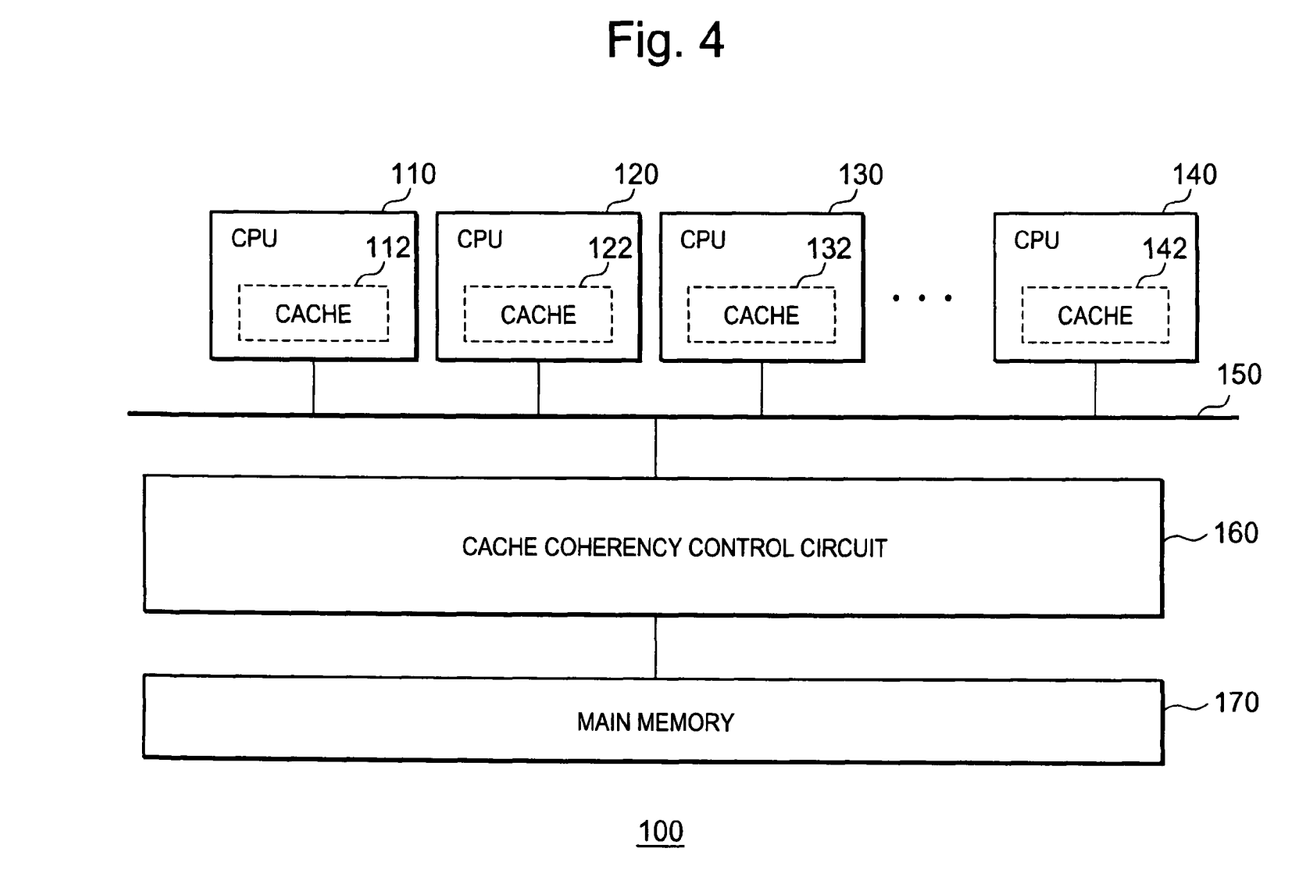
FIG. 4 is an example of a diagram of the multi-processor system of the present invention.

FIG. 4 shows a multi-processor system 100 according to the exemplary embodiment of the present invention. The multi-processor system 100 includes a plurality of (four in the example of FIG. 4) CPUs 110 to 140, a shared bus 150, a cache coherency control circuit 160, and a main memory 170.

The CPUs 110 to 140 are connected to the shared bus 150, and may communicate with each other and access the main memory 170 via the shared bus 50. Each of the CPUs 110 to 140 respectively includes a cache 112, a cache 122, a cache 132, and a cache 142. These caches operate in the write-back method. Other elements of each CPU are the same as those of the CPU 10 as shown in FIG. 1, and are omitted from FIG. 4.

A cache coherency control circuit 160 controls cache coherency, and is connected between the shared bus 150 and the main memory 170. The snoop method and the MESI protocol are exemplarily used as a protocol for ensuring the cache coherency in the multi-processor system 100 of the exemplary embodiment, for example.

Figure 5:
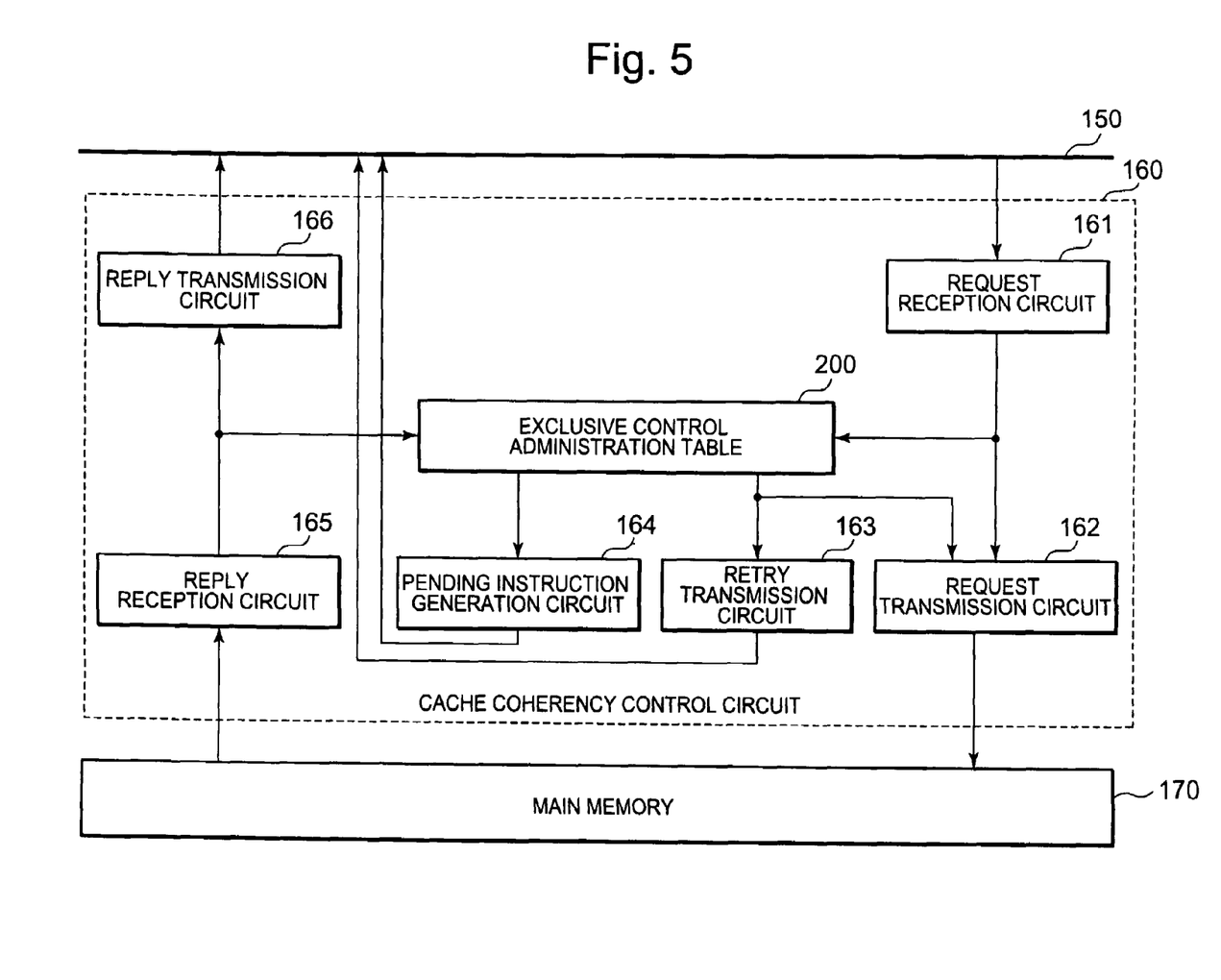
FIG. 5 is an example of a diagram of a cache coherency control circuit 160.

FIG. 5 shows the cache coherency control circuit 160 of the multi-processor system 100. The cache coherency control circuit 160 includes a request reception circuit 161, a request transmission circuit 162, a retry transmission circuit 163, a pending instruction generation circuit 164, a reply reception circuit 165, a reply transmission circuit 166, and an exclusive control administration circuit 200.

The request reception circuit 161 receives a read request, which accesses the main memory 170, from each of the CPUs 110 to 140, and transfers the received read request to the exclusive control administration circuit 200 and the request transmission circuit 162. When the request reception circuit 161 simultaneously receives the read requests from a plurality of the CPUs, the request reception circuit 161 arbitrates between the CPUs, and transfers the read request of the CPU, which obtains the arbitration, to the exclusive control administration circuit 200 and the request transmission circuit 162.

The exclusive control administration circuit 200 registers the read request received from the request reception circuit 161, and holds the read request until the reply reception circuit 165 receives the data (read data) corresponding to the read request from the main memory 170. In a case where the exclusive control administration circuit 200 receives the read requests corresponding to the same cache line address from a plurality of the CPUs, the exclusive control administration circuit 200 performs an exclusive control to prevent from being registered the latest data in the caches of each of the CPUs. The details of the exclusive control administration circuit 200 will be hereinafter described in detail.

The request transmission circuit 162 transfers the read request received from the request reception circuit 161 to the main memory 170. However, in a case where the read request of the same cache line address is already registered in the exclusive control administration circuit 200, the request transmission circuit 162 discards the received read request.

In a case where the read request of the cache line address requested by the read request which is received by the request reception circuit 161 is already registered in the exclusive control administration circuit 200, the retry transmission circuit 163 transmits the retry request to the requester CPU which issues the read request received by the request reception circuit 161.

Whether there already exists in the exclusive control administration circuit 200 the read request of the cache line address requested by the read request which is received by the request reception circuit 161, is notified by the exclusive control administration circuit 200 to the request transmission circuit 162 and the retry transmission circuit 163.

The reply reception circuit 165 receives the read data that the main memory 170 issues in response to the read request from the request transmission circuit 162, and transfers the read data to the exclusive control administration circuit 200 and the reply transmission circuit 166.

The reply transmission circuit 166 transmits the read data which is received from the reply reception circuit 165 to the requester CPU of the read request.

The pending instruction generation circuit 164 transmits, simultaneously with the transmission of the read data to the requester CPU of the read request, a pending instruction to a CPU other than the requester CPU for suspending issuing the request relating to read (e.g., the read request and the snoop request). The pending instruction generation circuit 164 transmits the pending instruction by referring to the exclusive control administration circuit 200.

Figure 6:
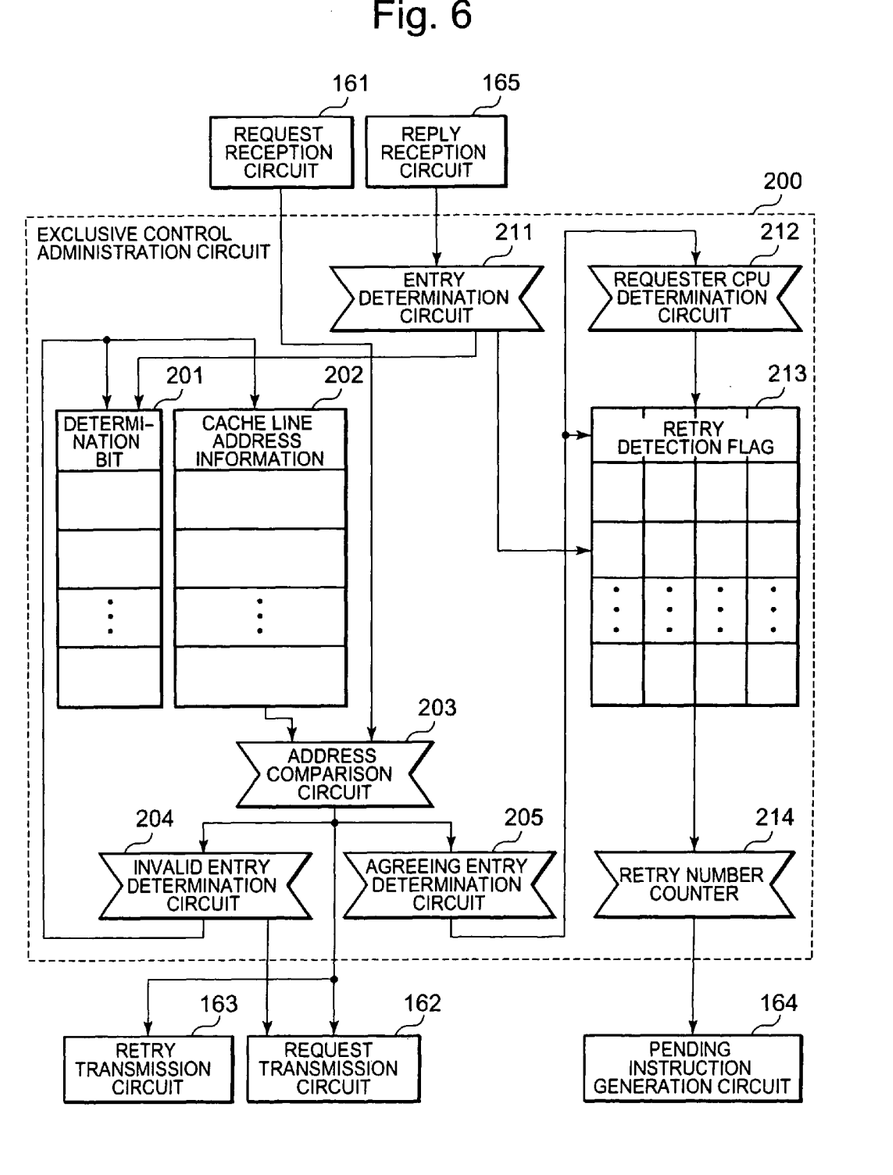
FIG. 6 is an example of a diagram of an exclusive control administration circuit 200 in the cache coherency control circuit 160.

FIG. 6 shows the exclusive control administration circuit 200. The exclusive control administration circuit 200 includes a plurality of entries, and each entry includes a determination bit 201 for determining whether the entry is effective or invalid, cache line address information 202 for indicating the cache line address corresponding to the data request to the main memory 170, and a retry detection flag 213. The retry detection flag 213 is for indicating that the retry request is transmitted to the requester CPU when receiving the read request of the same cache line address as the cache line address stored in the cache line address information 202. The requester CPU issues the read request of the same cache line address as the cache line address stored in the cache line address information 202.

The exclusive control administration circuit 200 includes an address comparison circuit 203, an invalid entry determination circuit 204, an agreeing entry determination circuit 205, an entry determination circuit 211, a requester CPU determination circuit 212, and a retry number counter 214.

When the request reception circuit 161 receives the read request, the address comparison circuit 203 looks up the determination bit 201 and the cache line address information 202. The address comparison circuit 203 compares the cache line address that the corresponding determination bit 201 is set to "1" with the cache line address requested by the received read request. The result of the comparison is outputted to the invalid entry determination circuit 204, the agreeing entry determination circuit 205, the request transmission circuit 162, and the retry transmission circuit 163.

If the cache line address requested by the received read request, which is received by the request reception circuit 161, is not stored as a result of the comparison performed by the address comparison circuit 203, then the invalid entry determination circuit 204 sets the determination bit 201 to "1", the determination bit 201 corresponding to a vacant entry which does not store any cache line address. And, the invalid entry determination circuit 203 registers the cache line address to the cache line address information 202. The invalid entry determination circuit 204 also outputs entry information indicating the entry, in which the read request is registered, to the request transmission circuit 162.

In a case where the cache line address which is requested by the received read request, which is received by the request reception circuit 161, is not stored as a result of the comparison performed by the address comparison circuit 203, the agreeing entry determination circuit 205 and the retry transmission circuit 163 do nothing. The request transmission circuit 162 transmits the read request and the entry information to the main memory 170, and holds the entry information.

As the result of the comparison performed by the address comparison circuit 203, in a case where there exists the cache line address agreeing with the cache line address requested by the received read request which is received by the request reception circuit 161, the agreeing entry determination circuit 205 obtains an entry number of the agreed cache line address, and sets the retry detection flag 213 of the entry corresponding to the obtained entry number. Each of the retry detection flag 213 corresponds to an identifier of each of the CPUs, for example, a CPU number. Each of the retry detection flag 213 indicates whether the retry request is transmitted to each of the CPUs. The requester CPU determination circuit 212 determines the requester CPU of the request based on information from the agreeing entry determination circuit 205, and supplies the identifier of the requester CPU to the retry detection flag 213.

In this case where there exists the cache line address agreeing with the cache line address requested by the received read request which is received by the request reception circuit 161, the invalid entry determination circuit 204 does nothing. The request transmission circuit 162 discards the read request. The retry transmission circuit 163 transmits the retry request to the requester CPU.

The main memory 170 outputs the data requested by the read request from the request transmission circuit 162 to the reply reception circuit 165. The reply reception circuit 165 transmits the data, which is outputted by the main memory 170, to the entry determination circuit 211. The data, which is outputted by the main memory 170, includes the entry information attached thereto.

The entry determination circuit 211 determines the entry which registers the read request corresponding to the data, which is transmitted from the reply reception circuit 165, based on the entry information attached to the data. And, the entry determination circuit 211 resets the determination bit 201 of the entry, which is determined by the entry determination circuit 211, to "0". "0" indicates that the entry is invalid. The entry determination circuit 211 looks up the retry detection flag 213, and obtains the number of CPUs whose flag is set, namely, the number of CPUs to which the retry request is transmitted, as a retry number. The retry number is outputted to the retry number counter 214. The retry number counter 214 counts the retry number, and outputs the retry number to the pending instruction generation circuit 164.

When the count value in the retry number counter 214 exceeds a predetermined threshold value (for example, 2), the pending instruction generation circuit 164 transmits a pending instruction, for temporarily suspending issuing the request relating to the read (e.g., the read request and the snoop request), to the CPUs other than the requester CPU, which issues the read request corresponding to the read data being received by the reply reception circuit 165.

The determination bit 201 and the cache line address information 202 corresponds to the cache line address information stored in the cache line address information store unit 94 of the multi-processor system 80 as shown in FIG. 1. The pending instruction generation circuit 164 corresponds to the pending instruction unit 96 of the multi-processor system 80 shown in FIG. 1. The request transmission circuit 162 corresponds to the read administration unit 92 of the multi-processor system 80 shown in FIG. 1.

Figure 7:
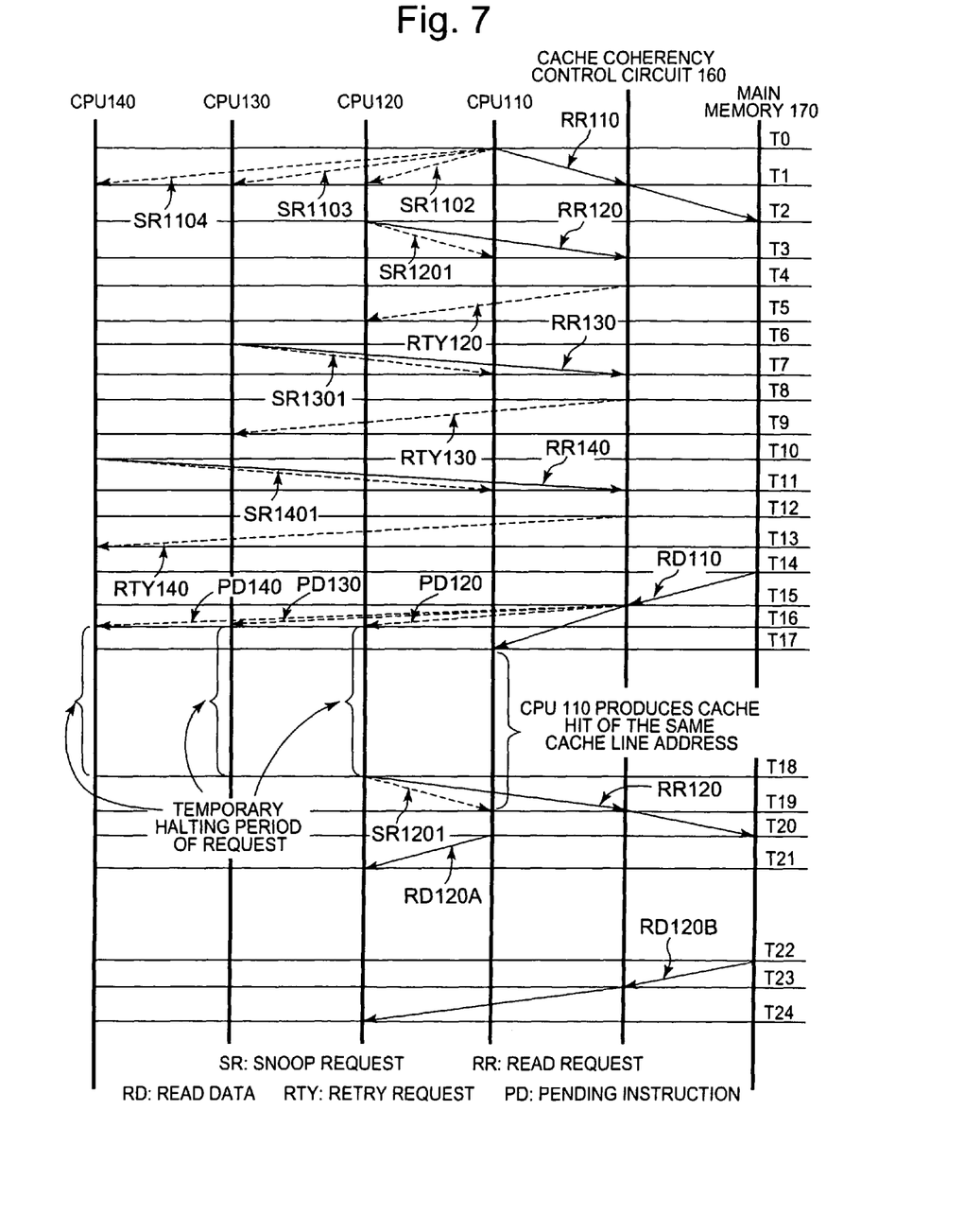
FIG. 7 is an example of a timing chart of the multi-processor system.

FIG. 7 shows an example of a timing chart in a case where each of a plurality of the processors reads the same cache line address at a close time. In FIG. 7, SR, RR, RD, RTY, and PD, respectively, denote "snoop request", "read request", "read data", "retry request", and "pending instruction". T1, T2, ... denote timings. It should be noted that among the snoop requests, only those relating to the CPU 110 are shown in FIG. 7. Other snoop requests corresponding to the CPU 120, 130 and 140 are omitted in FIG. 7.

In the example of FIG. 7, at T0, the CPU 110 incurs the cache miss at an address "C", for example. Accordingly, the CPU 110 outputs a read request RR110 to the main memory 170. The CPU 110 also outputs the snoop requests (SR1102, SR1103, SR1104). It is assumed that CPUs 120 to 140 also incur the cache misses, and do not respond to the snoop request which is issued by the CPU 110.

At T1, the read request RR110 from the CPU 110 is issued by the cache coherency control circuit 160 to the main memory 170.

At T2, the CPU 120 also incurs the cache miss at the address "C", and outputs a read request RR120 to the main memory 170. The CPU 120 also outputs the snoop request. Accordingly, at T3, the CPU 110 receives the snoop request SR1201 which is issued by the CPU 120, and the cache coherency control circuit 160 receives the read request RR120 from the CPU 120.

Because the CPU 110 is reading the data corresponding to the address "C" from the main memory 170, the cache coherency control circuit 160 outputs a retry request RTY 120 to the CPU 120 at T4.

Thereafter, the cache coherency control circuit 160 outputs retry requests RTY130 (T8) and RTY140 (T12) to the CPU 130 and the CPU 140, respectively, in response to the read requests RR130 and RR140.

At T14, the main memory 170 outputs the data corresponding to the address "C" (the read data RD110) to the CPU 110 via the cache coherency control circuit 160. This data is issued by the cache coherency control circuit 160 to the CPU 110 (T15).

At T17, the CPU 110 receives the read data RD110, and registers the read data RD110 to the cache 112 of the CPU 110.

Here, it is assumed that the number of the CPUs which are doing the retry is three (CPU 120, 130 and 140) and the number exceeds the threshold value "2" which is an example of the threshold in FIG. 7. Therefore, the cache coherency control circuit 160 issues a pending instruction PD120, a pending instruction PD130, and a pending instruction PD140 to the CPU 120, the CPU 130, and the CPU 140, respectively (T17).

Thus, the CPUs 120 to 140 temporarily suspend issuing the request relating to the read during T17 to T18. Accordingly, the CPU 110 gets the cache hit if the CPU 110 performs the read operation toward the address "C" again during T17 to T19.

The CPU 120 resumes the request at T18 in response to the retry request RTY120 received at T5, and issues the read request RR120 of the address "C" and the snoop request. At this moment, the CPU 110 outputs the read data RD120A to the CPU 120 since the CPU 110 gets the cache hit in response to the snoop request being sent by the CPU 120.

When the CPU 120 receives the read data RD120A from the CPU 110 at T21, the CPU 120 registers the read data RD120A to the cache 122 of the CPU 120.

A read data RD120B is also outputted from the main memory 170 to the CPU 120 at T22 in response to the read request RR120, but the CPU 120 discards the read data RD120B because the latest data is already registered in the cache of the CPU 120.

As shown in the timing chart of FIG. 7, the CPU 120 performs renewal of the read data RD120A which is received from the CPU 110. Even if the corresponding cache line in the CPU 110 is invalidated, the CPU 110 may get the cache hit with respect to the address "C" after the CPU 110 registers the data of the address "C" to the cache 112 at T17 and until the end of the request-suspending period of other CPUs. Thus, the access with a short latency in the CPU 110 may be achieved.

The multi-processor system 100 is a specific example of the multi-processor system 80, and may achieve the effects described in the description of the multi-processor system 80.

The present invention is hereinabove described based on the exemplary embodiment. The exemplary embodiment is an example, and various changes and additions/deletions can be made to the exemplary embodiment as long as the exemplary embodiment does not deviate from the subject matter of the present invention. A person in the art should be able to understand that these modifications having changes and additions/deletions applied thereto are included in the scope of the present invention.

For example, the multi-processor system 80 and the multi-processor system 100 include one main memory, but the cache coherency control technology of the present invention may be applied to a multi-processor system including multiple main memories, and such application ensures the cache coherency of the system, and improves the processing efficiency.

Figure 8:
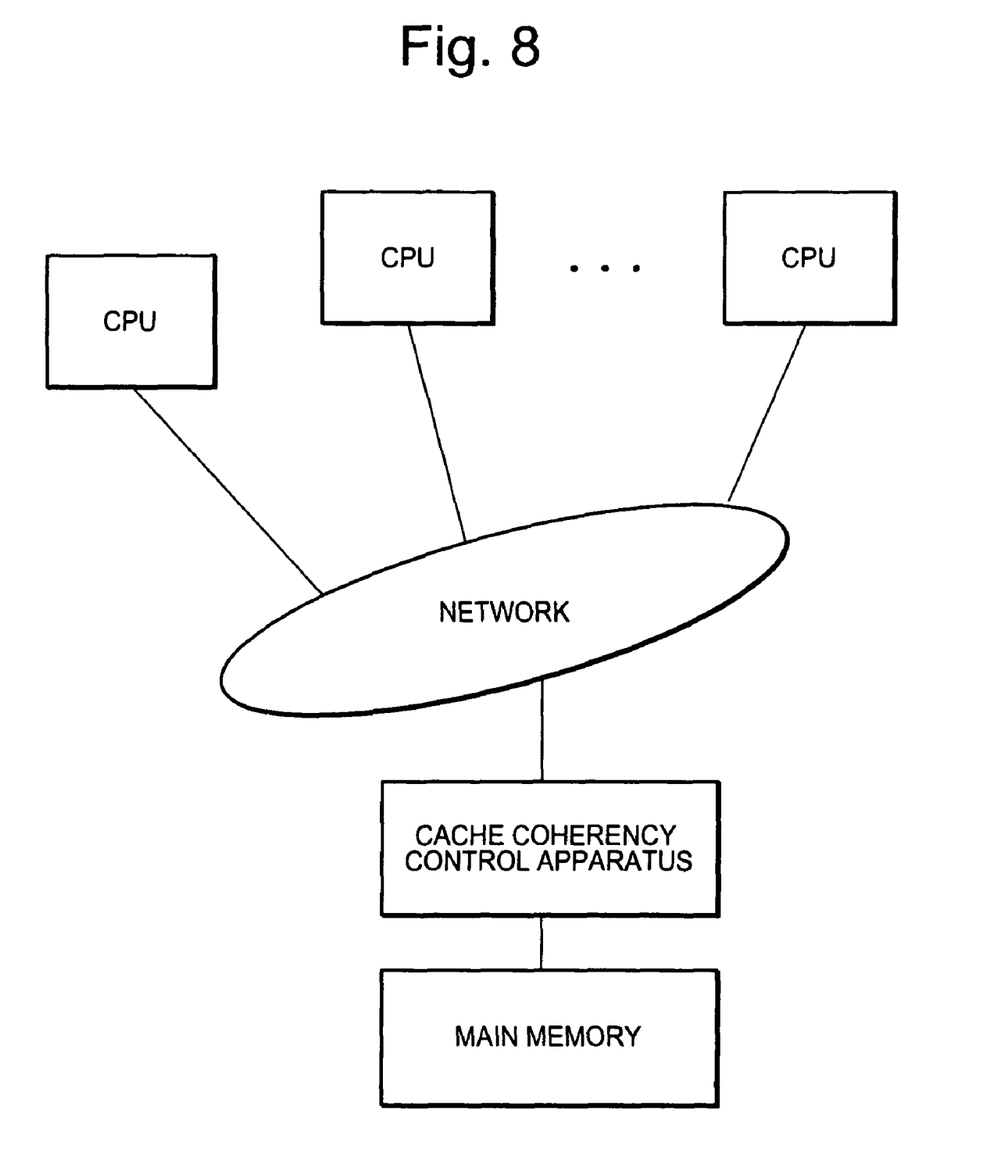
FIG. 8 is an example of another multi-processor system of the present invention.

Furthermore, although the multi-processor system including each processor and the main memory connected via the shared bus is taken as an example in the above description, the technology of the present invention may be applied to any multi-processor system in which the main memory is shared by multiple processors, and such application may achieve the effect thereof. For example, as shown in FIG. 8, the technology of the present invention may be applied to a multi-processor system in which multiple processors and a main memory are connected via a network.

Further, it is noted that Applicant's intent is to encompass equivalents of all claim elements, even if amended later during prosecution.

What is claimed is:

1. A cache coherency control circuit that shares a bus with a plurality of processors,
   wherein each of the processors includes a cache memory,
   wherein the cache coherency control circuit is exterior to each of said processors, and suspends a request of at least one of the processors during a predetermined period when one processor of said plurality of processors fetches data from a main memory to the cache memory of said one processor of the plurality of processors,
   wherein the cache coherency control circuit suspends the request of at least one of the processors except the processor which fetches the data from the main memory to the cache memory, wherein said cache coherency control circuit comprises:
a read administration unit;
a cache line address information store unit operatively coupled to the read administration unit; and
a pending instruction unit, operatively coupled to the cache line address information unit that outputs spending instruction that includes a cache line address stored in the cache line address information store unit, and
wherein, when the read administration unit receives a read request from one of the processors, the read administration unit performs a read operation on a condition that a cache line address corresponding to the read request is not stored in the cache line address information store unit.

2. The cache coherency control circuit according to claim 1, wherein the cache coherency control circuit suspends the request of the at least one of the processors when at least one of the processors issues the request while one processor of said plurality of processors fetches the data from the main memory to the cache memory of said one processor of the plurality of processors, the request accessing an address corresponding to an address of the fetched data.

3. The cache coherency control circuit according to claim 1, wherein the cache coherency control circuit suspends the request of the at least one of the processors which issues the request while one processor of said plurality of processors fetches the data from the main memory to the cache memory of said one processor of the plurality of processors, the request accessing an address corresponding to an address of the fetched data.

4. The cache coherency control circuit according to claim 1, wherein the cache coherency control circuit counts a number of the processors which issues the request while one processor of said plurality of processors fetches the data from the main memory to the cache memory of said one processor of the plurality of processors, and
wherein the cache coherency control circuit suspends the request of the processors when the number exceeds a predetermined value.

5. The cache coherency control circuit according to claim 1, wherein the cache coherency control circuit counts a number of the processors which issues the request while one processor of said plurality of processors fetches the data from the main memory to the cache memory of said one processor of the plurality of processors, and
wherein the cache coherency control circuit suspends the request of the at least one of the processors which issues the request while one processor of said plurality of processors fetches the data from the main memory to the cache memory of said one processor of the plurality of processors when the number exceeds a predetermined value.

6. The cache coherency control circuit according to claim 1, wherein the cache coherency control circuit, when the cache coherency control circuit receives a first request, rejects a second request subsequent to the first request, the second request accessing an address corresponding to an address of the first request.

7. The cache coherency control circuit according to claim 6, wherein the cache coherency control circuit requests one processor of said plurality of processors to retry a rejected request.

8. The cache coherency control circuit according to claim 7, wherein the cache coherency control circuit suspends the request of the processors when at least one of the processors retries the rejected request.

9. The cache coherency control circuit according to claim 7, wherein the cache coherency control circuit suspends the request of at least one of the processors which retries the rejected request.

10. The cache coherency control circuit according to claim 7, wherein the cache coherency control circuit counts a number of the processors which retries the rejected request, and
wherein the cache coherency control circuit suspends the request of the processors when the number exceeds a predetermined value.

11. The cache coherency control circuit according to claim 7, wherein the cache coherency control circuit counts a number of the processors which retries the rejected request, and
wherein the cache coherency control circuit suspends the request of at least one of the processors which retries the rejected request when the number exceeds a predetermined value.

12. The cache coherency control circuit according to claim 1, wherein the cache memory of each processor of the plurality of processors comprises a write-back type cache memory.

13. A processor, comprising:
a cache memory;
a request issuing circuit which issues a request when a cache miss occurs; and
a controller which suspends issuing of the request during a predetermined period upon receiving a suspension signal from an external controller that fetches data to the cache memory according to the cache miss,
wherein said external controller comprises:
a read administration unit;
a cache line address information store unit operatively the read administration unit; and
a pending instruction unit, operatively coupled to the cache line address information store unit, that outputs a pending instruction that includes a cache line address stored in the cache line address information store unit, and
wherein, when the read administration unit receives a read request from the processor, the read administration unit performs a read operation on a condition that a cache line address corresponding to the read request is not stored in the cache line address information store unit.

14. The processor according to claim 13, wherein the request issuing circuit retries the request when the request, toward a main memory, is rejected, and
wherein the controller suspends issuing of the request when receiving the suspension signal during retrying the request.

15. The processor according to claim 13, wherein the suspension signal includes an address which the request to be suspended accesses, and
wherein the controller suspends the request accessing the address.

16. The processor according to claim 13, wherein the cache memory of each processor of the plurality of processors comprises a write-back type cache memory.

17. A method of controlling a plurality of processors each of which includes a cache memory, by a controller which is exterior to said each of the processors, said method comprising:
fetching, by one processor of said plurality of processors, data from a main memory to the cache memory of said one processor of the plurality of processors according to a cache miss; and
suspending a request of the processors, except said one processor that fetches the data from the main memory to the cache memory of said one processor of the plurality of processors, during a predetermined period, wherein said controller comprises:
- a read administration unit;
- a cache line address information store unit operatively coupled to the read administration unit; and
- a pending instruction unit, operatively coupled to the cache line address information store unit, that outputs a pending instruction that includes a cache line address stored in the cache line address information store unit, and wherein when the read administration unit receives a read request from said one processor of the plurality of processors, the read administration unit performs a read operation on a condition that a cache line address corresponding to the read request is not stored in the cache line address information store unit.

18. The method according to claim 17, further comprising:
suspending the request of the processors when at least one of the processors issues the request while one processor of said plurality of processors fetches the data from the main memory to the cache memory of said one processor of the plurality of processors, the request accessing an address corresponding to an address of the fetched data.

19. The method according to claim 17, further comprising:
suspending the request of at least one of the processors which issues the request while one processor of said plurality of processors fetches the data from the main memory to the cache memory of said one processor of the plurality of processors, the request accessing an address corresponding to an address of the fetched data.

20. The method according to claim 17, further comprising:
counting a number of the processors which issue the request while one processor of said plurality of processors fetches the data from the main memory to the cache memory of said one processor of the plurality of processors; and
suspending the request of all processors of the plurality of processors when the number exceeds a predetermined value.

21. The method according to claim 17, further comprising:
counting a number of the processors which issues the request while one processor of said plurality of processors fetches the data from the main memory to the cache memory of said one processor of the plurality of processors, and
suspending the request of at least one of the processors which issues the request while one processor of said plurality of processors fetches the data from the main memory to the cache memory of said one processor of the plurality of processors when the number exceeds a predetermined value.

22. The method according to claim 17, further comprising:
when a controller receives a first request, rejecting a second request subsequent to the first request, the second request accessing an address corresponding to an address of the first request.

23. The method according to claim 22, further comprising:
requesting one processor of said plurality of processors to retry a rejected request.

24. The method according to claim 23, further comprising:
suspending the request of the processors when at least one of the processors retries the rejected request.

25. The method according to claim 23, further comprising:
suspending the request of at least one of the processors which retries the rejected request.

26. The method according to claim 23, further comprising:
counting a number of the processors which retry the rejected request; and
suspending the request of all processors of the plurality of processors when the number exceeds a predetermined value.

27. The method according to claim 23, further comprising:
counting a number of the processors which retries the rejected request; and
suspending the request of at least one of the processors which retries the rejected request when the number exceeds a predetermined value.

28. The method according to claim 17, wherein the cache memory of each processor of the plurality of processors comprises a write-back type cache memory.

* * * * *